Patented Feb. 24, 1953

2,629,685

UNITED STATES PATENT OFFICE 2,629,685

AVIATION FUEL AND METHOD OF PREPARING SAME

William E. Lifson, Elizabeth, and William E. Morris, Roselle, N. J., assignors to Standard Oil Development Company, a corporation of Delaware No Drawing. Application October 29, 1949, Serial No. 124,496

7 Claims. (Cl. 196—150)

This invention relates to an improved type of aviation fuel containing about 0.5% to 1% by volume of the extract obtained by the sulfur dioxide contacting of kerosene. This fuel is particularly adapted to eliminate difficulties heretofore encountered due to the formation of deposits in the air-fuel induction system of an aircraft engine.

For some time now difficulties have been encountered in the operation of aircraft engines utilizing air-fuel induction systems. Apparently due to the volatilization of fuel, deposits are formed in the induction system resulting in loss of engine power and necessitating frequent servicing to eliminate the deposits. Thus, for example, in engines utilizing a supercharger to compress the air-fuel mixture, it has been found that deposits tend to build up in this supercharger of a nature to lower the engine power by cutting down the quantity of fuel-air mixture reaching the engine. It is, therefore, the principal object of this invention to provide a fuel composition which substantially minimizes the formation of deposits in the air-fuel induction system of aviation engines.

The nature of induction system deposit formation is not entirely understood at the present time. It is believed that the deposits are largely caused by dyes and inhibitors in the fuel. These constituents of commercial aviation gasoline being substantially less volatile than the base fuel under the conditions of temperature and pressure prevailing in the air-fuel induction system, tend to adhere to the various portions of the induction system as solid deposits, when engine operating conditions are such that essentially complete evaporation of the base fuel takes place. Dyes and inhibitors have been altered and improved considerably with regard to their induction system deposit forming tendencies, and their concentration in the fuel reduced to the minimum, but nevertheless, induction system deposits continue to cause trouble. It is a point of interest that the formation of induction system deposits appears to be a function of climate, or temperature. Thus as would be expected aircraft engines of a given design operated at reasonably high temperatures are more subject to deposit formation than aircraft operated in cooler temperatures.

The problem of induction system deposit formation appears to be a unique problem for which no solution has hitherto been suggested in the art. To appreciate this it is helpful to differentiate induction deposit formation difficulties from other types of problems encountered with fuels. Thus a common difficulty which is met in using gasolines is the possibility of gum formation caused by unstable constituents in the gasoline. To meet the problem of gum deposition from the gasoline, various refining processes may be used, and in addition various inhibitors may be employed. However, it is significant that this is not the type of difficulty which is responsible for induction system deposit formation as evidenced by the fact that aviation fuels subject to induction system deposit formation are highly refined and inhibited so that gum formation is not a problem. In other words, aviation fuels are normally substantially gum stable. Similarly, the problem of induction system deposit formation is not of the type requiring the use of gum flux agents in the gasoline. Again, the necessity for using such agents arises from the tendency of a gasoline to deposit gum in the engine which can be minimized by employing suitable gum fluxing agents. It is, therefore, to be understood that the problem towards which this invention is directed is uniquely differentiated from problems of gum formation in the gasoline, or problems of fuel stability, or gum inhibition. Conversely, it is apparent that the properties of an agent which will minimize induction system deposit difficulties are uniquely different than the properties of gum inhibitors, solvent oils, gum flux agents, etc. To prevent confusion on this point throughout this disclosure the type of agent with which this invention is concerned will be identified as "an air-fuel induction system deposit suppressor."

Although as indicated it appears most likely that dyes and inhibitors required in the fuel are largely responsible for the deposit formation, it would clearly not be a practical solution to eliminate these required dyes and inhibitors from the fuel. Again, it does not seem to be a practical solution to alter the nature of the dyes or inhibitors, as this expedient has already been unsuccessfully explored. Consequently, effort has been directed to determining a method of overcoming deposit difficulties by employing a fuel additive without necessity for otherwise altering the nature of the fuel. The present invention is based on the discovery of a class of additives which effectively minimize deposit formation in an air-fuel induction system.

As a first approach to the problem of overcoming induction system deposits, consideration was given to the use of the type of oil which has been identified as "solvent oil," or "gum flux oil." These additives have been conventionally used in automotive fuels for a number of years in order to lubricate the engine parts, and in order to minimize deposit formation in the combustion zone of the engine, and on valves and pistons of the engine. Thus while solvent oils and gum flux oils have not been used to solve the type of problem here considered, nevertheless, there would appear to be some possibility that such agents could also aid in minimizing induction system deposit formation. U. S. Patent 2,066,234, issued to Sloane and Wasson on December 29, 1936, discloses the nature of solvent oils or gum flux oils heretofore used in gasoline fuels. It is there disclosed that a preferred solvent oil is one falling in the lubricating oil boiling range, and having a boiling range of up to 875° F.; thus other essential properties of the solvent oil are also identified, such as kauri-butanol solvent value above about 20. In attempting to utilize this type of solvent oil; that is, of the nature disclosed by U. S. Patent 2,066,234, it has been found impractical for use in aviation fuel. For example, addition of a solvent oil in quantities as small as one-half of 1% causes the resulting fuel blends to exhibit an extremely high copper dish residue. The result is that aviation fuels containing the stated quantity of solvent oil can not pass specifications defining the minimum quality of the aviation fuel. Again, use of conventional solvent oils in an aviation fuel is prohibitive from a practical viewpoint due to the deleterious effect of such an additive on the anti-knock properties of the fuel. Again, as small a quantity as one-half of 1% of a conventional solvent oil in an aviation fuel will lower the supercharged rich anti-knock rating of the fuel, as determined by ASTM method D-909, by more than two performance numbers. It is apparent that this decrease of the anti-knock rating of the fuel would either necessitate expensive steps to improve the quality of the fuel sufficiently to tolerate this performance number loss, or alternatively would simply cause a marked decrease in the quality of the fuel. In this connection it is significant that while knock may be tolerated and audibly controlled in an automotive engine, in an aircraft engine this is not the case, so that knocking may result in the actual destruction of an aircraft engine. Consequently, it has been found that conventional solvent oils can not be employed to solve the problem of deposit formation in the induction system of aviation engines.

Experiments of the nature indicated utilizing conventional solvent oils in aviation fuel have helped to define the critical specifications of a suitable air-fuel induction system deposit suppressor. In effect it has been determined that two principal problems are involved in developing a suitable induction system deposit suppressor.

First, the suppressor must be of a nature which will not adversely affect the quality of the aviation fuel with which it is blended. Thus, the suppressor should not markedly lower anti-knock rating of the fuel, nor should the suppressor adversely change other characteristics of the fuel, such as its distillation characteristics; copper dish gum residue, etc. This essential characteristic of a deposit suppressor is extremely stringent in the case of aviation fuels. In order to suitably characterize aviation fuels to insure their safe and successful use in aircraft fuel specifications have been carefully developed to critically define acceptable aviation fuels. One of the most widely used of these specifications is the Army and Navy specification, AN-F-48b. This specification is set forth in abridged form in Table I below, indicating the most critical of the fuel inspections required by this specification.

TABLE I

*Abridged specification inspections of aviation gasoline*

|  | AN-F-48b | |
|---|---|---|
|  | Min. | Max. |
| R.V.P., p. s. i. |  | 7.0 |
| Distillation, ASTM, ° F.: |  |  |
| IBP |  |  |
| 10% Evaporated |  | 167 |
| 40% Evaporated | 167 |  |
| 50% Evaporated |  | 221 |
| 90% Evaporated |  | 275 |
| FBP |  | 338 |
| Residue, percent |  | 1.5 |
| Loss, percent |  | 1.5 |
| Gum Content, mg./100 ml. Copper Dish Gum |  | 5.0 |
| Accelerated Gum Test: |  |  |
| Gum, mg./100 ml. |  | 6.0 |
| Ppt., mg./100 ml |  | 2.0 |
| Corrosion, Cu. Strip, Airwell, 3 hrs. @ 212° F. | Pass |  |
| Sulfur, Wt. percent |  | 0.05 |
| Freezing Point, ° F. |  | −76 |
| Water Tolerance | Pass |  |
| Inhibitor Content, #/5,000 gal. |  | 1.0 |
| Heat of Combustion, net, B. t. u./lb | 18,700 |  |

Each of the properties listed in Table I for valid reasons has been considered by those skilled in the art as being a valuable criterion of satisfactory aviation fuel quality. Consequently, it may be appreciated that it is essential in developing a suitable deposit suppressor that this agent does not adversely alter the characteristics of the fuel in which it is blended as indicated by the inspections of Table I. Thus, it is essential that a fuel blend containing a satisfactory deposit suppressor should have the distillation characteristics required by the Army and Navy fuel specification, and that the fuel should be able to pass the copper dish gum test indicated in Table I. As formerly indicated, these two specific requisites of an aviation fuel are most difficult to maintain when utilizing possible deposit suppressors. Thus, when the relatively high boiling solvent oils which have been conventionally used are employed in a gasoline, the distillation characteristics of this gasoline may be seriously altered. Again, as indicated, utilization of conventional solvent oils in aviation gasoline results in an extremely high gum content as determined by the copper dish gum test, greatly exceeding the maximum copper dish gum residue permitted by the AN-F-48b fuel specification. It, therefore, must be appreciated that the first requirement of a suitable deposit suppressor is that it must not adversely change the specification inspections of the aviation fuel in which it is to be used.

The second essential of a suitable deposit suppressor is clearly the requirement that in fact successful deposit elimination is obtained. It is probable that two essential properties are required in order that this requirement be met. First, the suppressor must be sufficiently non-volatile so as to maintain a liquid film in the air-fuel induction system. This liquid film apparently is operative to prevent deposit forming constituents of the fuel from adhering to the induction system. It is presently hypothesized that maintenance of a liquid film in the induction system minimizes deposit formations by substantially eliminating the opportunity for the build-up of adherent deposits and permitting inchoate deposits to be washed from the induction system. Secondly, it is probable that the deposit suppressor must have an extremely high solvent power towards the deposit itself. The high solvent power is in part required due to the fact that only extremely small quantities of a material less volatile than the gasoline can be tolerated in the fuel without adversely changing the fuel specifications. As will be developed, it is necessary that the deposit suppressor be utilized in proportions of not more than 1%, and further that the deposit suppressor be fairly volatile. Consequently, due to volatilization of a large part of the suppressor in the induction system, a relatively small quantity of suppressor is available to eliminate deposit difficulties. It is, therefore, of the greatest importance that the suppressor have an extremely high solvent power so as to be able to successfully dissolve any deposits which do tend to adhere to the induction system. It is believed that the solvent power of the suppressor is a critical requirement in combination with the ability of the suppressor to form a liquid film on the induction system.

To restate the essential characteristics of a suitable induction system deposit suppressor, this agent must have:

1. A critical volatility such that the distillation characteristics of the fuel will not be adversely affected, but at the same time so that a liquid film may be maintained in the induction system.

2. The agent must not materially depress the antiknock rating of the fuel when present in operative quantities.

3. The agent must have an extremely high solvency power since only small quantities of the agent may be employed without adversely affecting fuel specifications.

4. The agent must have a variety of suitable physical characteristics such as freezing point, viscosity, insolubility in water, etc.

In order to more clearly define the critical properties of a suitable deposit suppressor, data will be presented showing the effect on fuel specifications of minor quantities of possible deposit suppressors. Thus, indicated in Table II are the inspections of a number of materials which could conceivably function as air-fuel induction system deposit suppressors.

In column 1 of Table II inspections are given for a conventional motor gasoline solvent oil prepared according to the disclosures of U. S. Patent 2,066,234. This agent, representative of the conventional types of solvent oils which have been employed in automotive gasolines, is particularly characterized by an initial boiling point of about 588° F., and a final boiling point above 700° F. Column 2 presents the inspections of an induction system deposit suppressor in accordance with the teachings of the present invention consisting of a sulfur dioxide extract of a kerosene. It is particularly significant that this material has an initial boiling point of about 320° F. to 400° F., actually falling within the aviation fuel boiling range. The final boiling point of this material is only 542° F., thus falling well below the initial boiling point of the conventional solvent oil indicated in column 1. Column 3 of Table II indicates the characteristics of a high boiling alkylate bottoms fraction. Column 4 gives the inspections of a petroleum fraction rich in high boiling aromatics obtained by the reduction of oils subjected to a steam cracking operation. This material was particularly selected due to its high aromatic content supposedly qualifying it as a useful fuel additive, which due to its high boiling point would be expected to minimize induction system deposits. Column 5 indicates the inspections of an extract obtained from the phenol contacting of a light naphthenic base lube oil fraction, again representing the type of material conventionally employed as a solvent oil. Finally, column 6 indicates the inspections of a catalytically cracked cycle gas oil. In considering the data of Table II, it is particularly significant, as will be brought out more fully, that the kerosene extract of column 2 has a remarkably high solvent power as compared to any of the other materials identified. Nevertheless, it will be observed that the inspections of each of the materials in the table with the exception of the kerosene extract are of such a nature as to qualify these materials as solvent oils according to the conventional teachings relative to solvent oils.

TABLE II

*Inspections of possible induction system deposit suppressors in aviation gasoline*

| Column | 1 | 2 | 3 | 4 | 5 | 6 |
|---|---|---|---|---|---|---|
| Material | Motor Gasoline Solvent Oil | Kerosene $SO_2$ Extract | $C_4/C_5$ Alkylate Bottoms | High Boiling Aromatics | Phenol Extract from Lube Oil Mfg. | Cat. Cracked Cycle Gas Oil |
| Gravity, ° API | 26.1 | 22.8 | 31.4 | 16.8 | 15.8 | 27.5 |
| Distillation, Saybolt, ° F. IBP | 588 | 320 | 540 | 466 | 561 | 521 |
| 10% Recovered | 611 | 371 | 611 | 498 | 622 | 587 |
| 50% Recovered | 652 | 441 | 646 | 523 | 653 | 633 |
| 90% Recovered | 708 | 501 | 696 | 596 | 695 | 677 |
| FBP | | 542 | 734 | 660 | | 687 |
| Percent Recovery | 91.5 | 98.5 | 98.0 | 98.0 | | |
| Percent Residue | 8.4 | 1.1 | 1.2 | 1.3 | | |
| Percent Loss | 0.1 | 0.4 | 0.8 | 0.7 | | |
| Color, Robinson | 17¼ | | | | | |
| Cloud, ° F. | | <−35 | | | | |
| Pour, ° F. | −25 | <−35 | <−35 | −25 | −25 | +50 |
| Copper Strip Corr., 3 hrs. @ 212° F. | 3 | 3 | 3 | 2 | 3 | |
| Carbon Hydrogen Ratio | 6.750 | 8.719 | 6.629 | 8.37 | 6.950 | |
| Aniline Point, ° F. | 162.3 | −9.4 Freezes | 191.7 | 49.5 | 80.4 | |
| Bromine No., cg./g. | 4.1 | 3.2 | 5.9 | 21.8 | 5.5 | |
| Olefins + Aromatics, Vol. Percent | | 80.7 | [1] 19.2 | [1] 95.6 | 68.3 | |
| Aromatics, Vol. Percent | | 77.1 | | 65.8 | | |
| Sulfur, Wt. Percent | 0.727 | 0.163 | 0.025 | 0.37 | 0.51 | |
| General Motors Gum, mg./100 ml | 30 ml. unevap | 86.4 | 38 ml. unevap | 1,682 mg | 38.5 ml. unevap | |
| Solvent Power, Kauri-Butanol, Percent | 24.5 | 77.0 | 21.5 | 11.5 | 31.0 | 29.3 |

[1] Black tarry residue.

the kerosene extract would not ordinarily be considered as a suitable solvent oil, since its boiling range actually overlaps the aviation gasoline boiling range. Consequently, it would be expected to be too volatile for use as a solvent oil.

In order to determine the possibility of employing small quantities of the materials given in Table II, in an aviation fuel, aviation fuel blends were prepared containing 0.5% and 1.0% of each of these materials. Blends were prepared in two types of commercial aviation fuels, one being of grade 100/130 and the other being of grade 115/145. Tests were conducted to evaluate these blends to determine the effect of the additives of Table II on the inspections and anti-knock properties of the fuels. The results of these tests are indicated in Tables III and IV.

Referring first to Table III, typical data are presented showing the effect of blending 0.5% and 1.0% of a conventional solvent oil in a commercial aviation fuel. Inspections of these blends are given together with the inspections of the commercial base fuel employed and the most critical inspections required by ANF-48b specifications. Further, for comparison purposes, the inspections are given of similar blends containing 0.5% and 1.0% of an SO₂ extract of kerosene. In examining Table III, it will be noted that addition of an additive having the properties of a conventional motor gasoline solvent oil can not be tolerated in amounts as great as 1% since the distillation residue would then exceed the critical value set by the ANF-48b specifications. Considering the data given as to the stability of the fuel blends as indicated by the 16 hour Army gum test, it will be noted that the fuel blends containing conventional solvent oil could not successfully pass the Army gum requirements. The most significant data presented in Table III is that showing the effect of the solvent oil on the gum content as determined by the copper dish gum test; the copper dish gum tests of the solvent oil blends were entirely unsatisfactory. As brought out by Table III, therefore, the unsuitability of conventional solvent oils as possible deposit suppressors is demonstrated. Further, the data relative to blends of SO₂ extract of kerosene demonstrate that—unlike the solvent oil—SO₂ extract of kerosene can be tolerated in an aviation fuel without adversely affecting the inspections of the fuel.

Table IV presents significant data in regard to the effect on the anti-knock quality of aviation gasolines when the additives of Table II are employed. The anti-knock determinations were based on blends of the indicated additives in two grades of commercial aviation fuel. Anti-knock determinations were conducted on each fuel blend employing the F-3 method (ASTM method D-614), for lean performance, and the F-4 method (ASTM method D-909), for rich mixture performance. The marked effect on the anti-knock rating of the fuel caused by several of the constituents given is apparent. Thus, as particularly brought out by the data for concentrations of 1 or 2% of the additives, in the case of the motor gasoline solvent oil, the alkylate bottoms, the heavy boiling aromatics, and the cycle gas oil, anti-knock quality losses were sustained running as high as 11 performance numbers.

TABLE III

*Specification inspections of aviation gasoline blends*

| Base Fuel | | | Grade 100/130, (3.15 ml. TEL/gal.) | | | | |
|---|---|---|---|---|---|---|---|
| Potential Deposit Suppressor | Specifications (most critical) ANF-48b | | Base Fuel | Motor gasoline Solvent Oil | | SO₂ Extract of Kerosene | |
| | Min. | Max. | | | | | |
| Vol. percent in Blend | | | 0.0 | 0.5 | 1.0 | 0.5 | 1.0 |
| Gravity, °API | | | 66.5 | 66.1 | 66.0 | 65.9 | 65.8 |
| RVP, p. s. i. | | 7.0 | 5.5 | 5.3 | 4.3 | 5.2 | 5.2 |
| Distillation, ASTM, °F | (¹) | (¹) | | | | | |
| IBP | | | 117 | 116 | 117 | 115 | 123 |
| 10% Recovered | | 167 | 159 | 160 | 160 | 159 | 161 |
| 40% Recovered | 167 | | | | | | |
| 50% Recovered | | 221 | 206 | 208 | 207 | 207 | 207 |
| 90% Recovered | | 275 | 247 | 249 | 251 | 250 | 250 |
| 92% Recovered | | | 253 | 256 | 257 | 257 | 257 |
| 94% Recovered | | | 261 | 264 | 268 | 266 | 266 |
| 96% Recovered | | | 275 | 281 | 285 | 282 | 279 |
| 98% Recovered | | | 304 | | | 316 | 320 |
| FBP | | 338 | 317 | 315 | 319 | 325 | 329 |
| Recovery, percent | | | 98.5 | 97.5 | 98.0 | 98.0 | 98.0 |
| Residue, percent | | 1.5 | 1.0 | 1.2 | 1.8 | 1.0 | 1.2 |
| Loss, percent | | 1.5 | 0.5 | 1.3 | 0.2 | 1.0 | 0.8 |
| Gum Content, mg./100 ml.: | | | | | | | |
| Copper Dish Gum | | 5.0 | 1.3 | 363.1 | 757.3 | 1.3 | 2.1 |
| ASTM Gum | | | | | | | |
| General Motors Gum | | | 0.8 | 2.6 | 9.0 | 0.8 | 0.8 |
| Stability, 16 Hr. Army Gum: | | | | | | | |
| Gum+Lead, mg./100 ml | | 6.0 | 0.8 | 8.6 | 10.0 | 0.2 | 0.2 |
| | | | 0.6 | 5.6 | 8.4 | 0.4 | 0.4 |
| Ppt., mg./100 ml | | 2.0 | nil | nil | nil | nil | nil |
| Corrosion, Cu. Strip, Airwell: 3 hrs. @ 212° F | Pass | | Pass | Pass | Pass | Pass | Pass |
| Sulfur, Wt. percent | | 0.05 | 0.0037 | 0.0066 | 0.012 | 0.0016 | 0.0050 |
| Freezing Point, °F | | −76 | <−81 | <−81 | <−81 | <−81 | <−89 |
| Water Tolerance | Pass | | Pass | Pass | Pass | Pass | Pass |
| Aniline Point, °F | | | 135.9 | 135.7 | 135.9 | 135.1 | 134.6 |
| Inhibitor Content, #/5,000 gal | | 1.0 | ²0.51 | | 0.52 | 0.51 | 0.51 |

¹ % D+L Basis.
² N—N′ di-sec. butyl paraphenylene diamine.

TABLE IV

*Loss in antiknock quality of aviation gasolines containing possible induction system deposit suppressors*

[Uncorrected for loss due to reduction in TEL content from dilution of base fuel.]

| Base Fuel | Grade 100/130 | | | | | | Grade 115/145 | | | | | |
|---|---|---|---|---|---|---|---|---|---|---|---|---|
| Test Method, ASTM | F-3, Lean—Loss in Performance Numbers | | | F-4, Rich—Loss in Performance Numbers | | | F-3, Lean—Loss in Performance Numbers | | | F-4, Rich—Loss in Performance Numbers | | |
| Vol. Percent of Deposit Suppressor in Blend | 0.5 | 1.0 | 2.0 | 0.5 | 1.0 | 2.0 | 0.5 | 1.0 | 2.0 | 0.5 | 1.0 | 2.0 |
| Motor Gasoline Solvent Oil | 0.7 | 2.4 | 7.9 | 2.8 | 5.4 | 11.1 | 0.7 | 1.4 | 2.8 | 1.3 | 2.5 | 5.0 |
| SO₂ Extract of Kerosene | 0.2 | 0.1 | 0.2 | 0.0 | 0.0 | 0.3 | 0.0 | 0.0 | 0.0 | 0.4 | 0.7 | 1.4 |
| C₄/C₅ Alkylate Bottoms | 0.4 | 0.7 | 1.4 | 3.2 | 6.5 | 9.0 | 0.7 | 1.4 | 2.8 | 2.1 | 4.2 | 8.4 |
| Aromatics H. B | 0.5 | 0.8 | 1.5 | 1.8 | 3.5 | 7.4 | 0.8 | 1.6 | 3.2 | 0.6 | 1.2 | 2.4 |
| Cycle Gas Oil | | | | | | | 1.4 | 2.7 | 5.4 | 1.9 | 3.8 | 7.6 |
| Correction for TEL Dilution | 0.14 | 0.27 | 0.54 | 0.08 | 0.17 | 0.33 | 0.13 | 0.25 | 0.51 | 0.16 | 0.32 | 0.65 |

It will be observed, however, that the blends containing sulfur dioxide extract sustained a comparatively negligible performance number loss. This is particularly notable in the case of rich mixture performance tests on the grade 100/130 fuel, and the lean mixture performance tests on the grade 115/145 fuel. It is apparent from these data that the performance number loss caused by any of the possible additives, other than the sulfur dioxide extract, is sufficiently great to severely penalize their use in aviation fuels.

As suggested, a further critical requirement of a suitable deposit suppressor is a remarkably high solvent power. This may best be appreciated from the following examples. In these examples actual induction system deposits were removed from an air-line engine; 0.5 of a gram of the deposit was then mixed with 10 milliliters of a possible deposit suppressor at room temperature to determine the extent to which the deposit would be dissolved. In the first experiment a commercial grade 100 aviation fuel was employed, while in subsequent experiments a sulfur dioxide extract of kerosene was employed, a conventional motor gasoline solvent oil was employed, and a high boiling benzene alkylate was employed. Data obtained from these experiments are indicated in Table V.

TABLE V

*Relative solubility of induction system deposits in various experimental deposit suppressors*

[0.5 grams of deposit removed from engine contacted with 10.0 ml. of deposit suppressor at room temperature.]

| Deposit Suppressor | Percent of Deposit Dissolved in 10 ml. | Relative Solvency, Percent of Grade 100 | Kauri-Butanol Solvent Power, Percent |
|---|---|---|---|
| Commercial Aviation Gasoline Grade 100 | 23 | 100 | 32½ |
| SO₂ Kerosene Extract | 47 | 204 | 77½ |
| Conventional Motor Gasoline Solvent Oil | 20 | 87 | 24½ |
| Benzene C₁₂ Alkylate | 22 | 96 | 41 |

It will be observed from Table V that the deposit was dissolved to the greatest extent when utilizing the kerosene extract having a kauributanol solvent power of 77½%. This material is shown to be two or three times as effective in dissolving the induction system deposits as the other possible induction system deposit suppressors. It is apparent, therefore, that a material having a high kauri-butanol solvent power of the order of 70 or higher is greatly to be preferred as a deposit suppressor, making it possible to actually dissolve deposits formed in the induction system.

Further tests to determine the critical volatility range for a satisfactory deposit suppressor have shown that a substantial portion of the material should boil above approximately 450° F., while none of it should boil above approximately 575° F. To demonstrate this, tests were conducted in a glass model of an air-fuel induction system, wherein laboratory glassware was assembled to simulate the carburetor and manifold of an air-fuel induction system. The manifold was jacketed so that varying temperatures could be maintained in the manifold and suitable metering and temperature controls were employed to mix the fuel and air in the carburetor at a desired mixture strength and temperature. The manifold was terminated in glassware approximating a cyclone separator so that vaporized fuel-air mixture could be taken overhead from this separator, and so that any unvolatilized residue could be measured. Carburetor air temperature was controlled at 153° F. while the manifold temperature was maintained at 148° F. by means of a jacket in which methyl alcohol was refluxed. Fuel was supplied to the apparatus at the rate of 500 milliliters per hour at a fuel to air ratio of 0.067 pound per pound.

As pointed out previously, in order for a deposit suppressors contained in a given gasoline. posit formation, an adequate liquid film must be maintained in the air-fuel induction system. Thus the relative quantity of liquid residue collected in the glass induction system apparatus can be considered a measure of the effect of volatility on the relative effectiveness of various deposit suppressors contained in a given gasoline.

In a series of experiments, a number of experimental deposit suppressors of varying volatility contained in 0.5 and 1.0 volume per cent concentrations in a grade 100/130 aviation gasoline were evaluated in the apparatus by determining the quantity of liquid residue collected. The results of these tests, together with the copper dish gum tests on the fuel blend, are shown in Table VI.

TABLE VI

*Optimum volatility requirements for deposit suppressors*

[Blends of experimental deposit suppressors in grade 100/130 aviation gasoline copper disk gum test of base fuel=1.3 mg./100 ml.]

| Experimental Deposit Suppressor | Kerosene SO₂ Extract | | Kerosene SO₂ Extract | | Topped Kerosene SO₂ Extract | | Topped Kerosene SO₂ Extract | | Aromatic Fraction | | High Boiling Aromatics | | Motor Gasoline Solvent Oil | |
|---|---|---|---|---|---|---|---|---|---|---|---|---|---|---|
| Distillation, ASTM, ° F.: | | | | | | | | | | | | | | |
| 10% Recovered @ | 350 | | 371 | | 450 | | 478 | | 476 | | 498 | | 611 | |
| 50% Recovered @ | 416 | | 441 | | 470 | | 489 | | 510 | | 523 | | 652 | |
| 90% Recovered @ | 487 | | 501 | | 508 | | 519 | | 579 | | 596 | | 708 | |
| FBP Recovered @ | 534 | | 542 | | 553 | | 559 | | 648 | | 660 | | --- | |
| Volume percent of Suppressor Blended in Grade 100/130 Aviation Gasoline | 0.5 | 1.0 | 0.5 | 1.0 | 0.5 | 1.0 | 0.5 | 1.0 | 0.5 | 1.0 | 0.5 | 1.0 | 0.5 | 1.0 |
| Copper Dish Gum Test of Blends mg./100 ml | 1.3 | 2.1 | 2.5 | --- | 2.1 | 2.1 | 3.1 | 4.4 | 16.6 | 16.6 | Excessive | | 363 | 757 |
| Percent of Deposit Suppressor in Blends Remaining Unevaporated in Glass Model Induction System Test | 6 | 7 | 9 | 15 | 12 | 22 | 23 | 36 | 36 | 55 | 46 | 65 | 70 | 100 |

Tests on the same base fuel alone yielded no measurable liquid residue. However, when the experimental deposit suppressors were added to the base fuel, sizable quantities of residue were obtained, the higher the boiling range of the deposit suppressors, the greater the percentage of it which did not evaporate. But as the quantity of unevaporated liquid residue increased, the copper dish gum residue also increased, such that deposit suppressors having final boiling points exceeding approximately 575° F. failed to pass the 5.0 mg./100 ml. maximum specification limit. Thus, in order to assure an adequate liquid residue in the induction system, a substantial portion of a deposit suppressor should boil above approximately 450° F. although the 50% distillation temperature may be as low as 400° F. and in order to meet copper dish gum test specification limits, the final boiling point should not exceed approximately 575° F.

As indicated by the tests of the nature set forth, a successful aviation induction system deposit suppressor must have a variety of critical properties. Thus, a suitable agent must have a critically chosen volatility which, as defined by the data presented, requires that a substantial part of the mixture boils above about 450° F., although the 50% distillation point may be as low as about 400° F. In other words, the volatility of the agent must be such that a substantial part of the mixture boils above about 450° F., but such that none boils above 575° F. Again, as indicated by the data presented, the quantity of agent employed must be less than about 1% as any greater quantity would clearly have too great an effect on the fuel specifications. Thirdly, it has been demonstrated that the agent must have a low pro-knock effect in concentrations of 1%, or less. As presented, even though as small a quantity as one-half of 1% of the agent is employed, this quantity can be effective in markedly lowering the anti-knock rating of the fuel. And finally, it has been demonstrated that the deposit suppressor should have an extremely high solvent power represented by a kauri-butanol value of above about 70.

In accordance with the principles developed, it has been determined that the type of material formerly identified as sulfur dioxide extract of kerosene is uniquely qualified as an aviation induction system deposit suppressor. This material has a volatility meeting the critical volatility requirements defined. The material has a remarkably high kauri-butanol solvent power, and has a low pro-knock effect in concentrations of .5% to 1%, and it has suitable physical characteristics as regards viscosity, freezing point, etc. Consequently, in its most specific application, the present invention contemplates the addition of from 0.5% to 1% of a sulfur dioxide extract of kerosene to an aviation fuel. A suitable sulfur dioxide extract of kerosene may be obtained according to the conventional refining operations in which kerosene is subjected to sulfur dioxide extraction. The kerosene to be treated preferably consists of a straight-run distillate kerosene having a boiling range of about 350° to 550° F., and preferably having a sulfur content below about 0.5%. The sulfur dioxide treatment of the kerosene is carried out by contacting kerosene and sulfur dioxide in liquid phase in the conventional manner to obtain an extract phase consisting of the sulfur dioxide and constituents of the kerosene removed by the sulfur dioxide. The sulfur dioxide may be readily removed from this extract phase by distillation, providing what is designated as a sulfur dioxide extract of kerosene. This extract has a boiling range of about 350° to 550° F., has an aromatic content of about 60% to 70% or more, and has a solvency power, as indicated by the kauri-butanol test, of about 70% or higher.

It will be apparent to those skilled in the art that agents other than sulfur dioxide may be employed to secure the desired extract. Thus, if desired, any treating agent which selectively extracts aromatic constituents from the kerosene may be employed. For this reason the desired composition is best identified as being an aromatic extract of kerosene.

Data have already been presented showing the suitability of a sulfur dioxide kerosene extract for dissolving the type of deposit formed in induction systems, in regard to the low pro-knock effect of the kerosene extract, and in regard to the successful inclusion of .5 to 1% of the extract in an aviation fuel without causing the fuel to fail conventional specifications. To demonstrate the suitability of a sulfur dioxide extract of kerosene, as a deposit suppressor, tests were conducted in a glass model of an air-fuel induction system. In these experiments the previously described glass air-fuel induction system apparatus was employed with slight modifications, but using the same operating conditions. When the base fuel alone was introduced into the system, heavy green solid deposits were formed in the lower two-thirds of the manifold tube and no unevaporated liquid residue was collected. However, when 0.5 or 1.0 volume per cent of a kerosene extract was added to the fuel, the manifold tube showed only a trace of solid green deposits, and remained evenly wet with a green film of liquid. Thus, at both concentrations the aromatic extract was sufficiently non-volatile to maintain any deposit forming materials in solution or suspension, preventing drying and ultimate deposit formation. Further, it was found that, respectively, 0.13 and 0.55 milliliter of liquid residue were obtained from the separator of a character demonstrating that the potential deposit forming constituents were carried out of the manifold in the liquid residue. As a quantitative check of the deposit suppression, after each test run the manifold was thoroughly washed with 60 cc. of heptane followed with 60 cc. of acetone to remove any deposits present in the manifold. Thereafter the heptane-acetone washes were dried in an oven for 16 hours at 222° F., and the deposit was weighed. In the case in which the aviation fuel did not contain extract of kerosene, 38.6 grams (per 1000 gallons fuel) of oven dried deposits were obtained. When 0.5% of kerosene extract was included in the fuel, however, only 6.6 grams per 1000 gallons of deposit were obtained representing a deposit reduction of 83%. Finally when 1.0% of kerosene extract was included in the fuel, only 4.0 grams of deposit per 1000 gallons were obtained indicating a 90% reduction in deposit weight.

As a final check on the suitability of aviation fuel blends containing kerosene extracts, engine tests were conducted to determine whether or not the inclusion of the kerosene extract had any deleterious effect on engine conditions. 100 hour tests were conducted in a single cylinder full scale aircraft engine employing a simulated air-line 8 hour cycle of operation. In one series of tests commercial aviation grade 100 fuel was employed while in another comparable series of tests 0.7% of a kerosene extract having the inspections similar to those indicated in Table II were added to this same fuel. After the 100 hour test runs, it was found that the engine condition was similar in both tests. Used oil inspections were also similar, and indicated no significant dilution, or degradation. It was, therefore, established by these tests that inclusion of small quantities of a sulfur dioxide extract of kerosene can be tolerated in an aviation fuel without adversely affecting the engine condition.

In accordance with this invention, therefore, additives are to be employed in aviation fuels having a critical combination of properties in order to successfully prevent formation of air-fuel induction system deposits. Suitable additives are those having a volatility such that a substantial part of the material boils above about 450° F., but so that all material boils below 575° F. The material must have an extremity high solvent power of the order of about 60–70 or higher as measured by the kauri-butanol solvency test. Further, the material must be chosen so as to have a low pro-knock effect in concentrations up to 1%. As disclosed, a suitable additive of this nature is the extract obtained by the sulfur dioxide contacting of a kerosene fraction. In accordance with the invention such an additive is blended with conventional aviation fuel stocks in quantities of about .5 to 1% and preferably in quantities of about .7% by volume. The aviation fuel base stock with which the additive is employed should preferably have a final boiling point somewhat below the desired maximum specification final boiling point. Thus in preparing a fuel suitable to meet the AN–F–48b fuel specification, the base fuel should have a final boiling point not greater than about 320° F. Conventional fuel additives may be employed in the base stock. Thus phenylene diamine and/or alkyl phenol type inhibitors may be utilized, and anthraquinone, aniline, and/or naphthol type dyes may be employed. Normal concentrations of these additives may be employed, generally ranging from 0.05 to 1.2 lb. inhibitor per 5000 gallons of gasoline and 0.3 to 1.0 grams dye per 100 gallons of gasoline. The final gasoline blend will also contain the conventional quantities of lead alkyl anti-knock agents. At the present time up to 6 ml. per gallon of tetraethyl lead are employed.

What is claimed is:

1. An improved aviation fuel consisting essentially of an aviation gasoline base stock satisfying AN–F–48b specifications, containing about 0.5 to 1% by volume of an aromatic extract of kerosene having a 50% distillation temperature above about 400° F., and a final boiling point below about 575° F., and having a kauri-butanol solvent value above about 70.

2. An improved aviation fuel consisting essentially of a hydrocarbon fuel base boiling in the aviation gasoline boiling range, and having an ASTM aviation octane number above about 100, containing from 0.5 to 1% by volume of an air fuel induction system deposit suppressor consisting of hydrocarbons having a 50% distillation temperature above about 400° F. with a substantial portion boiling above about 450° F. and a final boiling point below about 575° F., characterized by a kauri-butanol solvent value above about 70, and having substantially no effect on the anti-knock rating of the fuel blend.

3. The method of preparing aviation motor fuel which comprises adding to liquid petroleum hydrocarbons boiling in the aviation gasoline range, having an ASTM aviation octane number above about 100 and satisfying AN–F–48b fuel specifications, about 0.5 to 1% by volume of an aromatic extract of kerosene having a 50% distillation temperature above about 400° F. and a final boiling point below about 575° F., and having a kauri-butanol solvent value of about 70.

4. An improved aviation fuel consisting essentially of an aviation gasoline base stock satisfying AN–F–48b specifications containing about 0.5 to 1% by volume of an $SO_2$ extract of kerosene, having a 50% distillation temperature above about 400° F., and a final boiling point below about 575° F., and having a kauri-butanol solvent value above about 70.

5. The method of preparing aviation motor fuel which comprises adding to liquid petroleum hydrocarbons boiling in the aviation gasoline range having an ASTM aviation octane number above about 100 and satisfying AN–F–48b fuel specifications, about 0.5 to 1% by volume of an $SO_2$ extract of kerosene having a 50% distillation temperature above about 400° F., and a final boiling point below about 575° F., and having a kauri-butanol solvent value of about 70.

6. The composition defined by claim 1 in which the said aromatic extract comprises about 0.7% by volume of said improved aviation fuel.

7. The composition defined by claim 2 in which the said deposit suppressor comprises about 0.7% by volume of said improved aviation fuel.

WILLIAM E. LIFSON.
WILLIAM E. MORRIS.

REFERENCES CITED

The following references are of record in the file of this patent:

UNITED STATES PATENTS

| Number | Name | Date |
|---|---|---|
| 1,585,473 | Edeleanu | May 18, 1926 |
| 1,661,566 | Edeleanu | Mar. 6, 1928 |
| 2,318,710 | Persyn | May 11, 1943 |
| 2,534,025 | Howes et al. | Dec. 12, 1950 |